March 30, 1965   A. H. KERSEY ETAL   3,175,424
TRANSMISSION SYSTEMS, PARTICULARLY FOR AGRICULTURAL TRACTORS
Filed Aug. 3, 1962   2 Sheets-Sheet 2
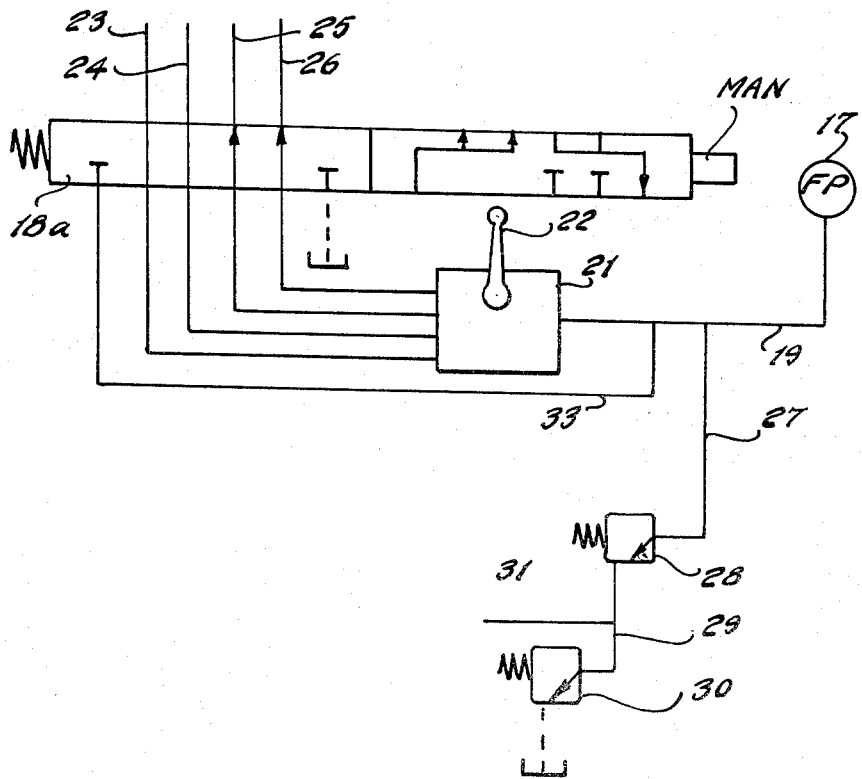
INVENTORS:
ALBERT H. KERSEY
BY FREDERICK J. SMITH
ATTORNEYS.

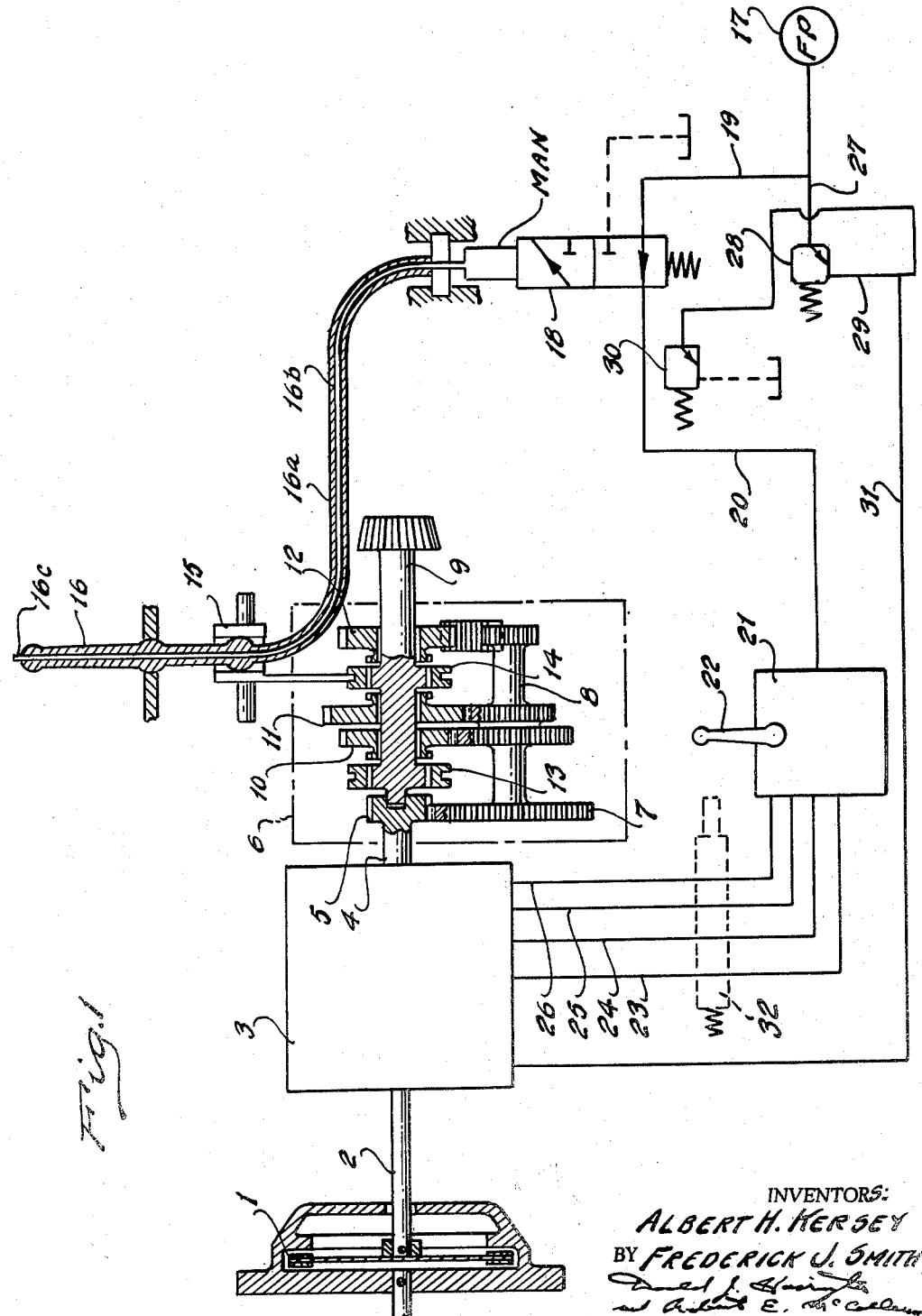

United States Patent Office 3,175,424
Patented Mar. 30, 1965

3,175,424
TRANSMISSION SYSTEMS, PARTICULARLY FOR AGRICULTURAL TRACTORS
Albert H. Kersey, Brentwood, and Frederick J. Smith, Chase Cross Romford, England, assignors to Ford Motor Company, Dearborn, Mich., a corporation of Delaware
Filed Aug. 3, 1962, Ser. No. 214,677
Claims priority, application Great Britain, Aug. 4, 1961, 28,463/61
1 Claim. (Cl. 74—740)

This invention relates to transmission systems, particularly for agricultural tractors, incorporating a power operated change speed arrangement in series with a manual shift arrangement, including at least one reverse gear, and more particularly to such arrangements where the power operated arrangement is ahead of the manual arrangement.

A certain proportion of tractor work involves frequent changing from forward to reverse directions of travel.

An object of this invention is to relieve the operator of the fatigue involved when operating a clutch to effect the required gear changing in this type of transmission.

The invention accordingly consists in a transmission system comprising a hydraulic power shift unit ahead of a manual shift unit incorporating a reversing gear, personally operable control valve means for the power shift unit and a control over-riding valve for interrupting the torque path in the power shift unit irrespective of the position of the control valve means.

Thus with a four speed power shift unit there are four hydraulically actuated clutches and brakes, all of which must be released for torque path interruption.

To achieve this end it may be necessary to position the valve to cut off the supply of pressurised hydraulic fluid to the control valve means or the power shift servos.

Alternatively, as a safety factor certain of the clutches and brakes may be hydraulically released so that failure of the hydraulic supply does not interrupt the torque path, and in such cases the overriding valve must lie between the control valve means and the servos so as to direct fluid to the servos which must be energized to release and to cut the fluid supply from the other servos.

The invention will be further described with reference to the drawings wherein:
FIGURE 1 is a diagrammatic layout of one embodiment of the invention; and
FIGURE 2 illustrates a modification of a part of the layout of FIGURE 1.

Referring first to FIGURE 1, the transmission is illustrated as including a flywheel-mounted manually operable clutch 1 which when engaged transmits drive to input shaft 2 of a four-speed planetary-type power shift unit 3. In the unit 3 the speeds are obtained by the application of pairs of clutching means out of a total of four clutching means in the unit. Neutral is obtained by releasing all the clutching means.

The output shaft 4 of power shift unit 3 is directly connected to input drive gear 5 of a manual change, constant-mesh gearbox 6. Gear 5 meshes with gear 7 which is part of a layshaft 8. Rotatably mounted upon gearbox output shaft 9 are gears 10, 11 and 12 which are respectively second gear, low gear and reverse gear. Dog clutches 13 and 14 are slidably mounted upon shaft 9 and engage dog clutch teeth on gears 5, 10, 11 and 12, when required.

Dog clutches 13 and 14 are moved in the usual manner by forks 15 actuated by gear lever 16, the operation of which is arranged so that low gear 11 and reverse gear 12 are located on each side of and adjacent to dog 14 so that either gear can be engaged by moving gear lever 16 backwards or forwards in a single simple movement.

Protruding from gear lever 16 is the end of a slidably mounted rod 16c, to the opposite end of which is attached a flexible cable 16b encased in an outer cable 16a attached at its upper end to gear lever 16. The lower end of cable 16b is attached to the spool of a control overriding valve 18 and the lower end of outer cable 16a is fixed to the transmission casing.

Referring now to the hydraulic system a fixed delivery pump 17 is connected to the overriding valve 18 by a pressure line 19. Line 20 connects overriding valve 18 to a control valve assembly 21 which is operated by means of manual lever 22. Supply lines 23, 24, 25 and 26 connect control valve 21 to the servos of the clutching means in power shift unit 3.

Joined to supply line 19 between pump 17 and control overriding valve 18 is line 27 leading to pressure relief 28, to relief valve 30 and to line 31, which leads from line 29 to power shift unit 3 to supply lubricating oil.

The above description refers only to a power shift unit in which all the clutch means are hydraulically applied. Alternatively, in a power shift unit wherein some of the clutching means are mechanically applied by springs and hydraulically released a different control overriding valve 18a (as shown in FIGURE 2) is used and located in the position shown in FIGURE 1 by phantom lines at 32.

FIGURE 2 shows diagrammatically an alternative control overriding valve 18a, in which lines 23 and 24 supply fluid to release two of the clutching means and lines 25 and 26 supply fluid to apply two of the clutching means in power shift unit 3. A line 33 connects control overriding valve 18a to line 19, by-passing the manual control valve 21.

In the position shown the overriding valve does not affect the control of pressure in lines 23, 24, 25 and 26 by valve 21.

The operational procedure is as follows:
When the tractor is engaged in work other than that requiring frequent changing to reverse travel the correct working range of speed would be selected in gearbox 6 and speed changes would be obtained in power shift unit 3 by operating lever 22 of valve control assembly 21. Neutral would also be obtained in this manner without operating either clutch 1 or control overriding valve 18 or 18a.

However, when engaged in work requiring frequent reversing a convenient gear ratio in the power shift unit 3 would be selected by operating lever 22 and changes from forward to reverse or vice versa then made by operating gear lever 16 in the following manner:

*Using control overriding valve 18*

The operator would depress the end of rod 16c to slide the cable 16b along the outer cable 16a and actuate control overriding valve 18 thus cutting off the oil supply from the pump 17 along line 19 and allowing the high pressure oil from the clutching means in power shift unit 3 to return to sump along line 20. Therefore, power shift unit 3 is returned to a non-drive or neutral condition and gear lever 16 can be operated to move dog 14 into engagement with either low gear 11 or reverse gear 12. Upon release of rod 16c the tractor would resume travel either forward or reverse at the original speed determined by the ratio selected in power shift unit 3.

Using control overriding valve 18a

In the case of the alternative where some of the clutching means are applied by springs, the operation is as follows, referring to FIGURE 2:

Actuation of control overriding valve 18a will cut off fluid supply to lines 25 and 26 and direct fluid trapped in these lines to sump, thus releasing the two hydraulically applied clutching means. Also fluid will be directed via line 33 into lines 23 and 24, thus releasing the two spring applied clutching means. The power shift unit 3 will, therefore, be in a non-drive or neutral condition.

Gear lever 16 can then be operated to engage forward or reverse gears in the manual change gearbox and upon release of rod 16c the tractor will resume travel in the desired direction.

Various modifications may be made within the scope of the invention. Thus the described method of actuating the control overriding valve 18 or 18a by means of a cable is only one of many alternative means by which this can be achieved. Further, the valve could be operated by a pedal if so desired.

What we claim is:

A power transmission system comprising a power input shaft, a power output shaft, a power input gear, a forward drive gear and a reverse drive gear journaled for rotation about the axis of said power output shaft, gearing drivably connecting said power input gear and each of the other of said gears, dog clutch teeth on each of said other gears, a dog clutch element carried by said power output shaft and adapted to move axially in either direction from a neutral position into engagement with one of said other gears, a manually operated shift lever means for shifting said clutch element in either direction to establish selectively forward drive and reverse drive, fluid pressure operated multiple speed ratio torque transfer means for connecting said power input gear and said power input shaft, a source of fluid pressure, conduit structure interconnecting said pressure source and said torque transfer means, said conduit structure including separate branch portions extending to separate pressure sensitive regions of said torque transfer means and accommodating distribution of pressure thereto, first personally operable valve means disposed in and partly defining each branch portion of said conduit structure for controlling distribution of pressure thereto, second personally operable valve means disposed in and partly defining said conduit structure in series with said first valve means for selectively interrupting the distribution of pressure through said first valve means to said pressure sensitive regions and exhausting the same, said second valve means comprising a valve chamber, a sliding valve element in said valve chamber having two operating positions, said valve element cooperating with said valve chamber to define a pressure delivery path from said source when it assumes one of said positions and to define an exhaust flow path from said pressure sensitive regions when it assumes the other of said positions, and mechanical means having a personally operable portion adjacent said shift lever means and movable in unison therewith for actuating said second valve means independently of the operation of said shift lever means whereby said torque transfer means can be disabled during shifting movement between the forward drive and reverse drive positions.

References Cited by the Examiner
UNITED STATES PATENTS

| | | | |
|---|---|---|---|
| 2,640,374 | 6/53 | Willis | 74—745 |
| 2,904,146 | 9/59 | Codlin. | |
| 2,923,175 | 2/60 | Perkins | 74—740 |
| 2,932,988 | 4/60 | Flynn et al. | 74—740 X |
| 2,990,925 | 7/61 | Bernotas. | |
| 3,059,504 | 10/62 | Hill | 74—339 X |

DON A. WAITE, *Primary Examiner.*